United States Patent
Yu et al.

(10) Patent No.: US 10,576,727 B2
(45) Date of Patent: Mar. 3, 2020

(54) GENERATING THREE DIMENSIONAL PROJECTIONS

(71) Applicant: Lenovo (Singapore) Pte. Ltd., Singapore (SG)

(72) Inventors: Jonathan Jen-Wei Yu, Raleigh, NC (US); Aaron M. Stewart, Raleigh, NC (US); Lincoln Penn Hancock, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 302 days.

(21) Appl. No.: 15/481,029

(22) Filed: Apr. 6, 2017

(65) Prior Publication Data

US 2018/0290397 A1 Oct. 11, 2018

(51) Int. Cl.
| | |
|---|---|
| *B29C 67/00* | (2017.01) |
| *B33Y 10/00* | (2015.01) |
| *B33Y 30/00* | (2015.01) |
| *B33Y 50/02* | (2015.01) |
| *B29C 64/386* | (2017.01) |
| *H04N 9/12* | (2006.01) |
| *B33Y 50/00* | (2015.01) |
| *G02B 27/22* | (2018.01) |

(52) U.S. Cl.
CPC .......... *B33Y 30/00* (2014.12); *B29C 64/386* (2017.08); *B33Y 50/00* (2014.12); *G02B 27/2292* (2013.01); *H04N 9/12* (2013.01)

(58) Field of Classification Search
CPC ........ G02B 27/24; B33Y 10/00; B33Y 30/00; B33Y 50/00; B33Y 50/02; H04N 9/12
See application file for complete search history.

(56) References Cited

U.S. PATENT DOCUMENTS

| | | | | |
|---|---|---|---|---|
| 2008/0266523 | A1* | 10/2008 | Otsuka | G02B 27/2285 353/7 |
| 2011/0037952 | A1* | 2/2011 | LaDuke | G02B 27/2292 353/28 |
| 2017/0072637 | A1* | 3/2017 | Yanazume | B33Y 50/02 |

* cited by examiner

*Primary Examiner* — Cara E Rakowski
*Assistant Examiner* — Christopher A Lamb, II
(74) *Attorney, Agent, or Firm* — Ference & Associates LLC (57) ABSTRACT

One embodiment provides a method, including: receiving, at an information handling device, user input to generate a three dimensional projection of an object in physical space; generating, using a projection source, a plurality of perspective views of the object, wherein each of the plurality of perspective views is associated with a different angle of the object; and providing, using the plurality of perspective views, the three dimensional projection of the object at a predetermined location in the physical space using at least one reflective surface. Other aspects are described and claimed.

14 Claims, 5 Drawing Sheets

GENERATING THREE DIMENSIONAL PROJECTIONS

BACKGROUND

Advances in technology have led to the development of three-dimensional ("3D") printers that are capable of creating a physical object from a digital model. The physical object can be of almost any shape or geometry and may be formed under computer control by laying down many thin layers of material in succession. Users may use information handling devices ("devices"), for example, desktop computers, laptop computers, tablet devices, and the like, to construct, edit, and visualize the digital model prior to printing the corresponding physical object.

BRIEF SUMMARY

In summary, one aspect provides a method, comprising: receiving, at an information handling device, user input to generate a three dimensional projection of an object in physical space; generating, using a projection source, a plurality of perspective views of the object, wherein each of the plurality of perspective views is associated with a different angle of the object; and providing, using the plurality of perspective views, the three dimensional projection of the object at a predetermined location in the physical space using at least one reflective surface.

Another aspect provides a system, comprising: at least one projection source; at least one reflective surface; an information handling device; a processor; a memory device that stores instructions executable by the processor to: receive user input to generate a three dimensional projection of an object in physical space; generate, using the at least one projection source, a plurality of perspective views of the object, wherein each of the plurality of perspective views is associated with a different angle of the object; and provide, using the plurality of perspective views, the three dimensional projection of the object at a predetermined location in the physical space using the at least one reflective surface.

A further aspect provides a product, comprising: a storage device that stores code, the code being executable by a processor and comprising: code that receives user input to generate a three dimensional projection of an object in physical space; code that generates a plurality of perspective views of the object, wherein each of the plurality of perspective views is associated with a different angle of the object; and code that provides, using the plurality of perspective views, the three dimensional projection of the object at a predetermined location in the physical space using at least one reflective surface.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users generally rely on software to preview 3D objects. For example, when a user is attempting to print an object on a 3D printer, the user must rely on the device display in order to preview the data prior to printing in order to attain an approximation of how an object may look in real space. For example, a user wanting to print a coffee table may view and interact with a digital model of the coffee table on a display screen. The interaction allows the user to move the object around on the display in order to see all sides of the object. Generally, the digital model is a scaled down version of the actual object to be printed (e.g., in order to fit within the physical boundaries of the display). This digital preview may be visualized on a variety of devices such as computers (e.g., desktop computers, laptop computers, etc.), handheld devices (e.g., tablets, smart phones, etc.), head mounted devices (HMDs), and the like.

However, these conventional methods of previewing an object do not enable a user to see a real-size visualization (e.g., a 1:1 ratio preview) of the object in physical space. Currently, users must either view the object as 3D data on a flat or curved display screen or they must use augmented or virtual reality technology to virtualize the object. Computers and handheld devices are not capable of producing a 1:1 preview rendering for many objects (e.g., for objects greater than the size of the display screen) and HMDs used for virtual and/or augmented reality purposes are both bulky and inconvenient to use in many situations. Additionally, neither of these conventional methods is able to generate a 1:1 preview of the object in the location where the object will be printed (e.g., at a 3D printer base). Furthermore, visualizing something on a screen does not provide a perspective of how the object will look and interact in a physical space.

Accordingly, an embodiment provides a method for providing a three dimensional projection of an object in physical space, for example, an object to be printed, an object for display in a space, and the like. In an embodiment, user input (e.g., mouse input, keyboard input, touch input, etc.) may be received at a device to generate a three dimensional projection of the object. Subsequent to receiving the user input, an embodiment may generate a plurality of perspective views (e.g., front, back, left, right, etc.) of the object using at least one projection source (a display, a projector, another projection source, etc.). An embodiment may then use the plurality of perspective views to provide the three dimensional projection of the object at a predetermined location using at least one reflective source (e.g., glass, tulle, fog, etc.). Such a method may enable users to attain a 1:1 ratio projection of an object, which may allow them to attain a better visualization of how the object may look in physical space. Additionally, such a method may allow a user to preview any changes made to the 3D data (e.g., color, size, etc.) in order to get a better approximation of how those changes may affect the appearance of the physical product.

The illustrated example embodiments will be best understood by reference to the figures. The following description is intended only by way of example, and simply illustrates certain example embodiments.

Figure 1:
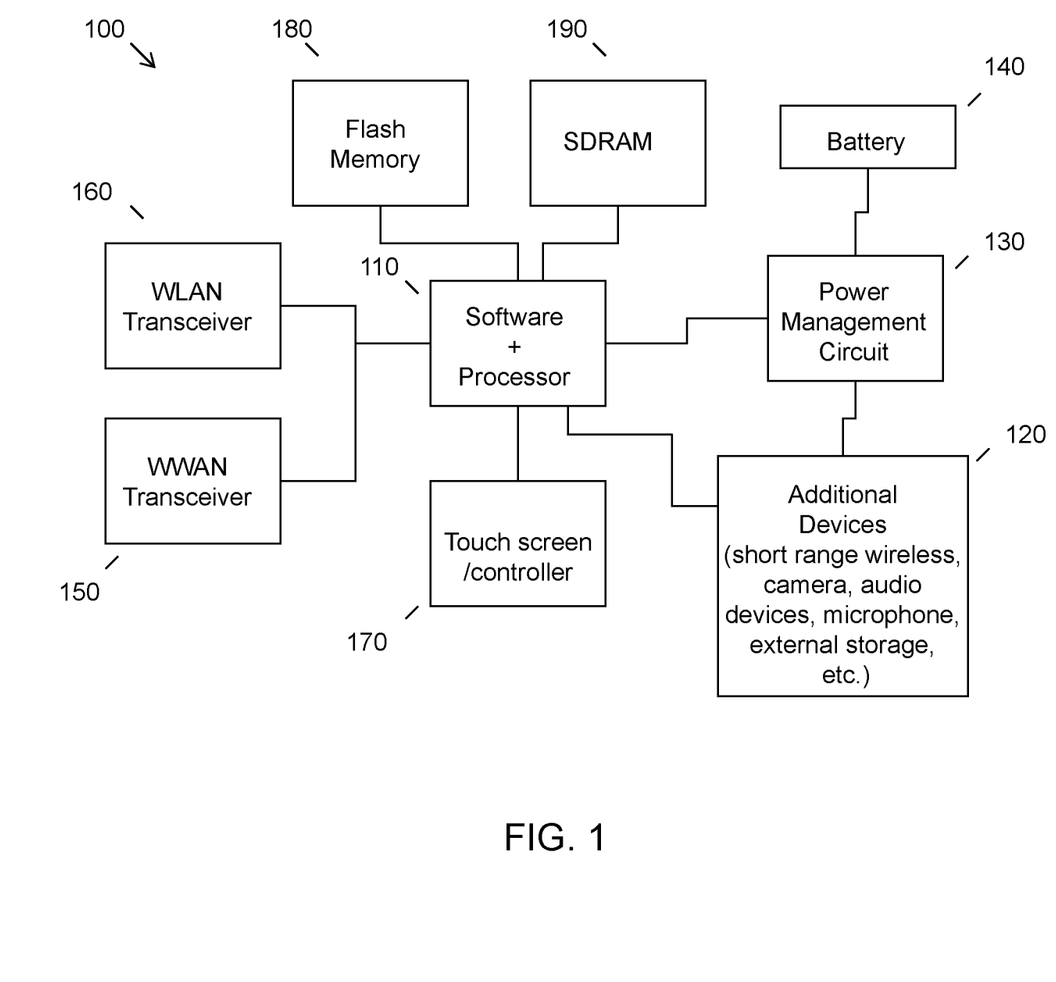
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
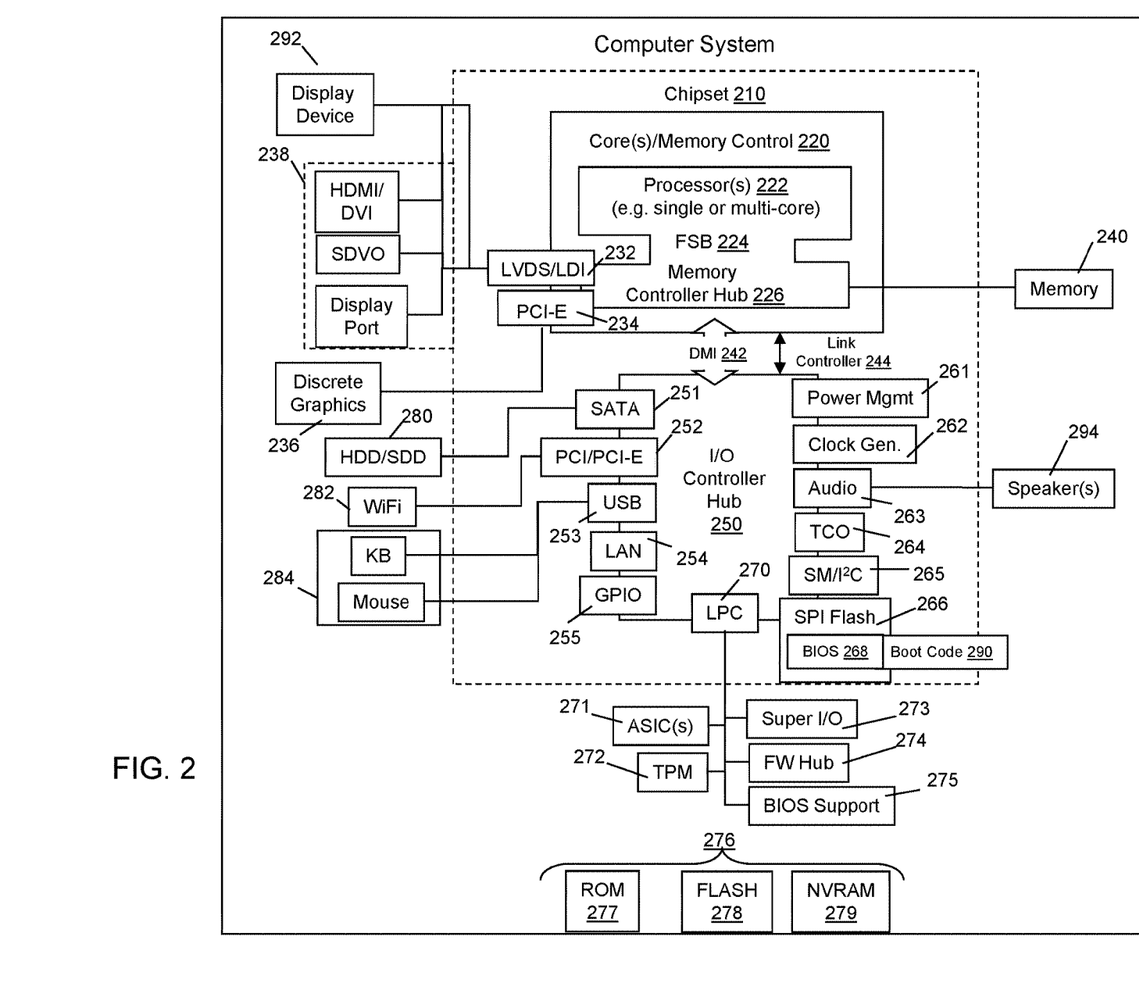
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices may be used for generating multiple perspectives views, or images, of an object and providing a three dimensional projection of the object in physical space. For example, the circuitry outlined in FIG. 1 may be implemented in a tablet or smart phone embodiment, whereas the circuitry outlined in FIG. 2 may be implemented in a personal computer embodiment.

Figure 3:
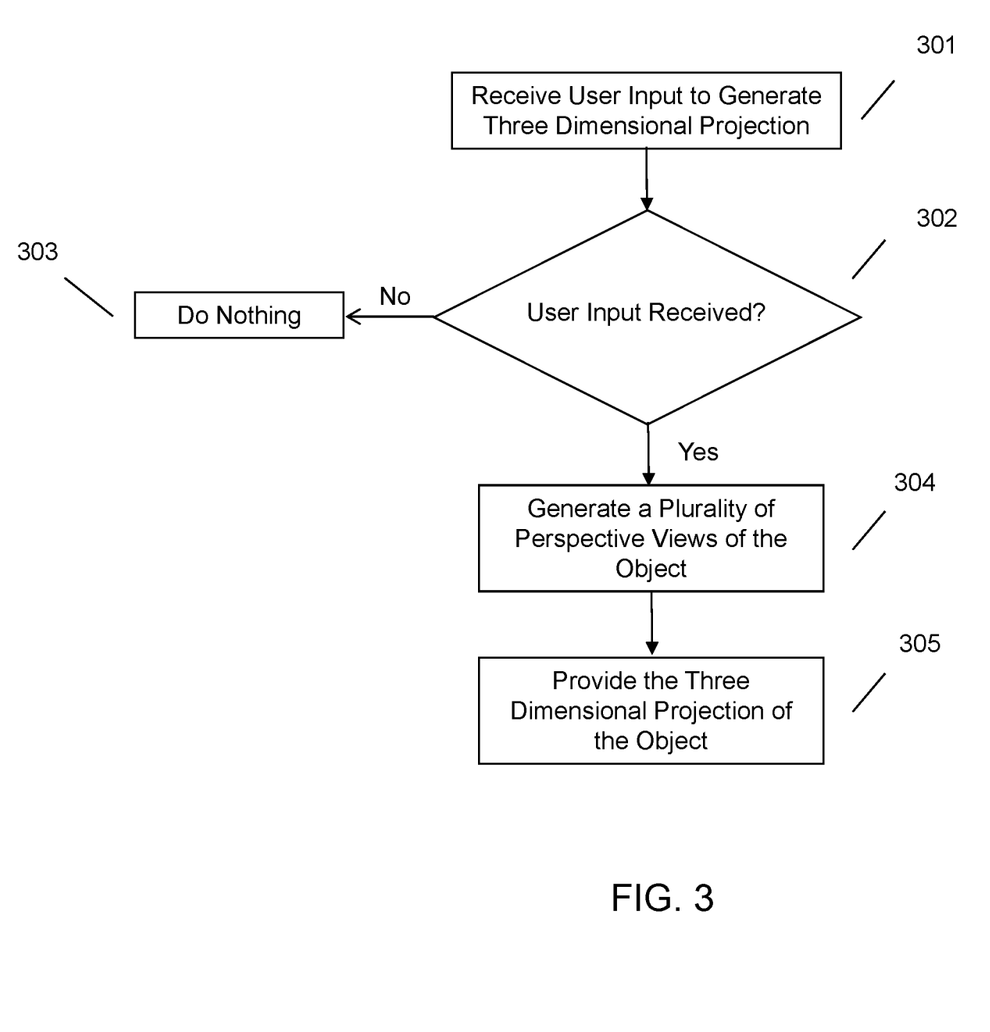
FIG. 3 illustrates an example method of providing a three dimensional preview of an object in physical space.

Referring now to FIG. 3, an embodiment may provide a 3D projection of an object to be projected in physical space. At 301, an embodiment may receive user input (e.g., touch input, stylus input, keyboard input, mouse input, etc.) at an information handling device (e.g., desktop computer, laptop computer, tablet, etc.) to generate a 3D projection of an object in physical space. In an embodiment, the object may be any object loaded onto a 3D printing application. For example, the object may be a user constructed design (e.g., created using 3D modeling software, etc.) or, alternatively, the object may be a predefined object that is loaded into the 3D printing application. Furthermore, the object may be of any size and shape capable of being printed by a 3D printer.

In an embodiment, the user input to generate the 3D projection may stand alone or may coincide with user input to print the object. For example, when a user provides input to the device to print the object, the device may automatically receive an indication to generate the 3D projection simultaneously. In an embodiment, the color, size, proportions, and other parameters, of the 3D projection may correspond to the actual color, size, proportions, and other parameters of the object to be printed or viewed. For example, the 3D projection may be a 1:1 ratio projection of the object. The 1:1 ratio projection may enable users to attain a more accurate visualization of how an object may look when it is printed or appear in a physical space. Alternatively, the 3D projection may comprise different proportions than the object to be printed. For example, the 3D projection may be larger or smaller than the actual object. Such a "non-scaled" projection may be useful, for example, for users printing smaller items (e.g., silverware, pottery, circuit boards, etc.) who wish to attain a better view of the finer details of the object (e.g., for objects that are intricately designed, objects having small pieces, etc.). The "non-scaled" projection may also be useful, for example, for users printing large objects (e.g., houses, machinery, etc.) who wish to be able to see all sides of the object without requiring a ladder or other apparatus.

Responsive to receiving the user input at 301, an embodiment may, based upon determining the user input has been received at 302, generate a plurality of perspective views, or images, of the object using at least one projection source (e.g., a display, a projector, another projection source, etc.) at 304. The projection source may be used to display the perspective views, or images, at an appropriate location in order to generate the 3D projection. In an embodiment, each of the plurality of perspective views may be associated with a different angle of the object and may also be projected at different physical locations. For example, four perspective views may be generated of an object where each of the four views is associated with a different side of the object (e.g., front, back, left, right, etc.). In an embodiment, each of the plurality of perspective views may be generated at predetermined positions. For example, the predetermined positions may correspond to predetermined positions on the display, predetermined projection locations, etc. Responsive to determining no user input was received, at 302, an embodiment may, at 303, take no further action.

Figure 4:
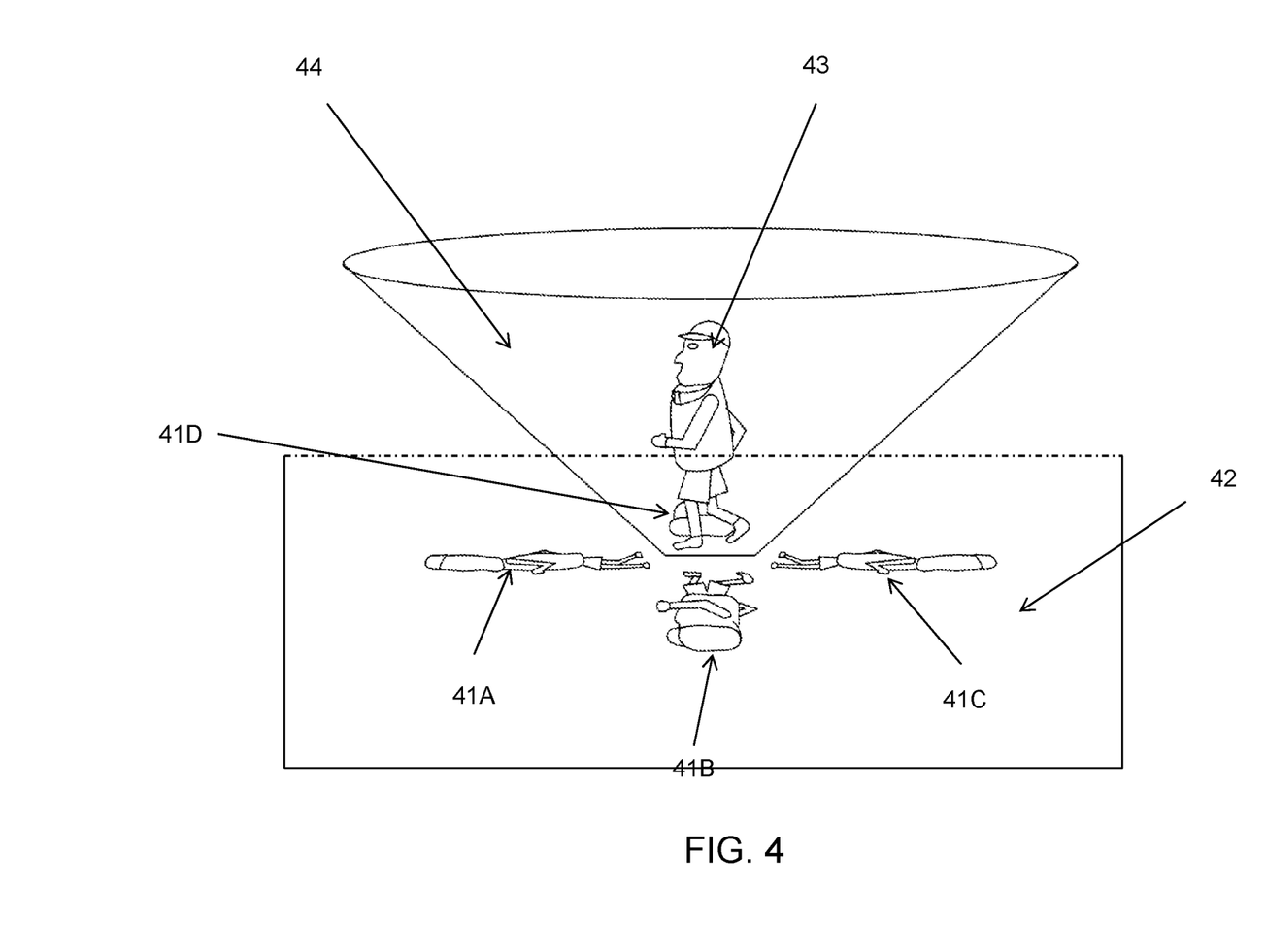
FIG. 4 illustrates an example three dimensional projection according to an embodiment.

As an example, referring to FIG. 4, an example arrangement of a plurality of perspective views 41(A-D) is illustrated. In FIG. 4, a projection source 42, such as a display, is used to generate multiple different perspective images 41(A-D) of a 3D projection 43 (e.g., such as walking person illustrated at 43). The projection 43 may correspond to what the user provided as input at 301. As can be seen from the figure, the multiple images 41(A-D) may be associated with different sides of the 3D projection 43 and may be displayed at predetermined locations on the display 42. As explained in more detail below, the arrangement of the projection source and reflective surfaces cause the projected perspective views to create a visualization or projection of the actual object at 43. The visualization of the actual object looks like the actual object, either at a 1:1 ratio or other scaled ratio, that will be printed or displayed at the location. This visualization may have the appearance of a displayed object without a screen or other display device behind the object. In other words, the visualization may appear like a 3D hologram or other 3D projected image.

At 305, an embodiment may provide the 3D projection of the object at a predetermined location in physical space by using at least one reflective surface. In an embodiment, the generated perspective views may be projected against at least one reflective surface to create the projection. In an embodiment, more than one (e.g., two, three, four, etc.) reflective surfaces may be utilized and these multiple reflective surfaces may be arranged in a specific configuration with respect to one another in order to direct the 3D projection to appear at a predetermined location. For example, referring again to FIG. 4, four reflective surfaces 44 arranged in a reverse pyramid configuration are illustrated. The plurality of perspective images 41(A-D) generated by the display 42 are projected onto the reflective surfaces 44, which are subsequently combined to form the centralized 3D projection 43 of the walking person. In an embodiment, the reflective surface 44 may be composed of a material capable of reflecting light such as glass, tulle, fog, another type of reflective material, etc.

Figure 5:
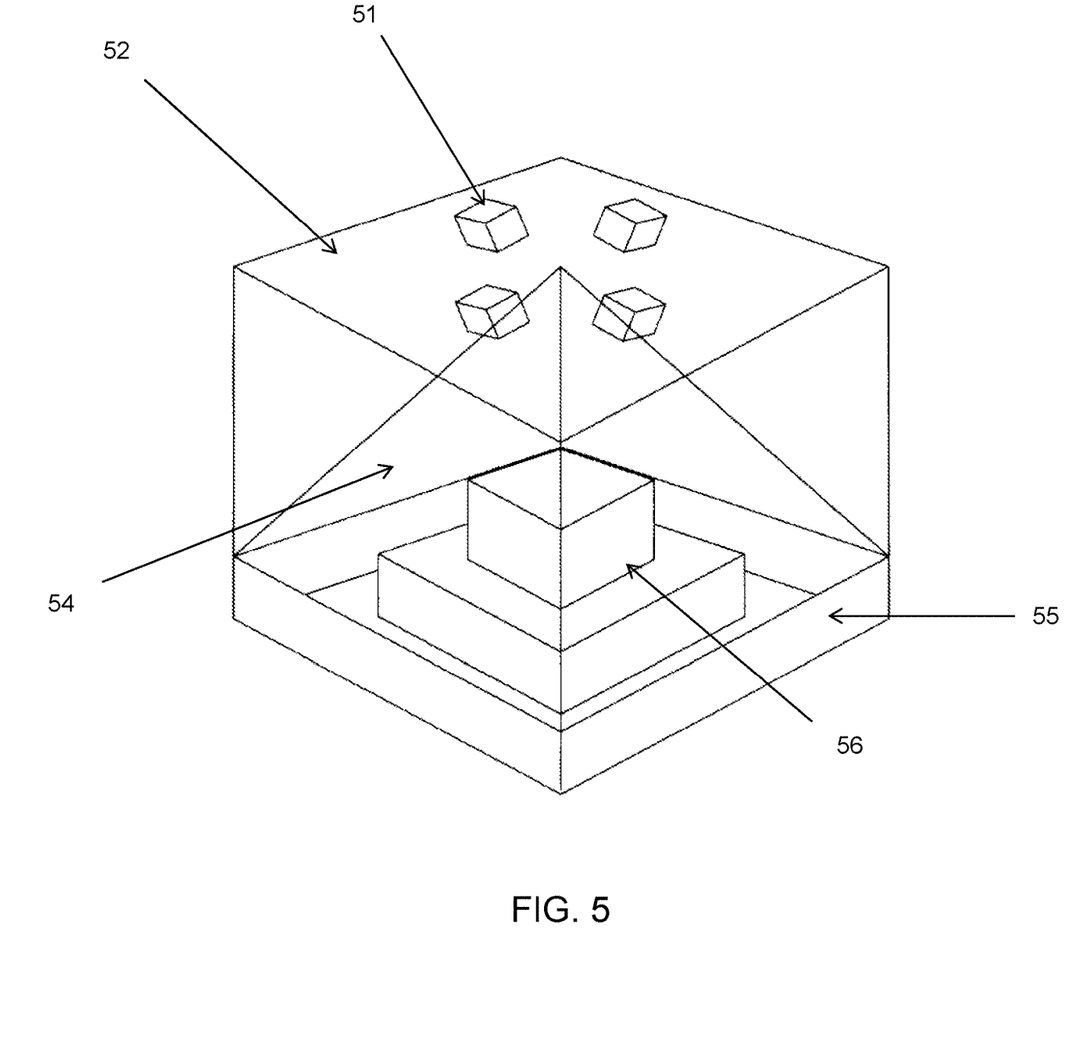
FIG. 5 illustrates another example of a three-dimensional projection according to an embodiment.

In an embodiment, the predetermined location may be a location where the object is printed. For example, the predetermined location may be the printing base of a 3D printer. Referring now to FIG. 5, four reflective surfaces arranged in a pyramid configuration are illustrated. In the example illustration, the reflective surfaces are positioned above a printing base of a 3D printer and underneath a display. Although the display is placed above the reflective surfaces in the illustration, this is a non-limiting arrangement. In other embodiments, the display may be placed above, below, or around the 3D printer in order to provide the optimal configuration to create the 3D projection. The placement of the display, or other projection source, may depend on the type of 3D printer used. Different printers build output in different ways. For example, some printers build output from the top down (e.g., Stereolithography (SLA) 3D printers, etc.) while others do the opposite and build from the bottom up (e.g., Continuous Liquid Interface Production (CLIP) 3D printers, etc.). The type of projection source, the number of reflective surfaces, and the arrangement of the reflective surfaces with respect to the projection source may all depend on the type of printer used so as to create as few disturbances to the projection as possible.

In the arrangement illustrated in FIG. 5, showing a 3D printing base 55, the display 52 may generate four perspective views, for example, 51, of an object (e.g., here, a cube), which are then projected onto each of the reflective displays, for example, 54, to generate the projection of the cube 56. Although the projection illustrated in FIG. 5 is centered in the middle of the four reflective displays, the position of the projection may be adjusted to appear at any other location inside the four reflective surfaces (e.g., by adjusting where the perspective views are generated, by adjusting where the perspective views are projected onto the reflective surfaces, etc.).

In an embodiment, if a 3D projection is situated over a printing base, the printed object may fill the projection as it is being printed. This may allow a user to see whether the printed product coincides with the proportions and design aspects of the projection. Additionally, this may allow the user to approximate the amount of printing remaining by comparing the projection against the actual 3D printed output. In an embodiment, the 3D projection may be changed while the object is being printed. For example, a user may wish to alter an aspect (e.g., size, shape, color, etc.) of the projection to see how an alteration or addition to an object may look. In an embodiment, the projection may automatically change as aspects of the digital model associated with the printed object are changed. For example, if, during printing, a user decides to change a portion of the object that has not yet been printed, the projection may automatically be updated to reflect these changes.

The various embodiments described herein thus represent a technical improvement to 3D object previewing techniques. Using the techniques described herein, an embodiment may generate a plurality of perspective views of an object to be printed or displayed in a physical space. Subsequent to generating the perspective views, an embodiment may utilize a projection source and at least one reflection source to provide a 3D projection of an object to be printed in physical space. Such techniques enable users to attain a better visualization how the object to be printed may look in real space by providing the user with a 1:1 ratio, or other ratio, preview of the object. Additionally, such techniques allow a user to preview any changes made to the 3D data (e.g., color, size, etc.) in order to get a better approximation of how those changes may affect the appearance of the printed product.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:

receiving, at an information handling device, user input to generate a three dimensional projection of an object in physical space;

generating, using a projection source, a plurality of perspective views of the object, wherein each of the plurality of perspective views is associated with a different angle of the object; and providing, using the plurality of perspective views, the three dimensional projection of the object at a predetermined location in the physical space using at least one reflective surface;

wherein the at least one reflective surface comprises four triangular shaped reflective surfaces;

wherein the four triangular shaped reflective surfaces are arranged in a pyramid shape over a printing base;

wherein the providing comprises providing the three dimensional projection inside of the arranged four triangular shaped reflective surfaces.

2. The method of claim 1, wherein the three dimensional projection of the object comprises a 1:1 ratio projection of the object.

3. The method of claim 1, wherein the generating comprises generating the plurality of perspective views of the object at multiple predetermined positions.

4. The method of claim 1, wherein the predetermined location comprises a printing location of the object.

5. The method of claim 4, further comprising printing the object at the printing location, wherein the printed object fills the three dimensional projection.

6. The method of claim 1, further comprising adjusting the three dimensional projection during a printing duration of the object.

7. The method of claim 1, wherein the at least one reflective surface comprises a material selected from the group consisting of glass, tulle, and fog.

8. A system, comprising:
- at least one projection source;
- at least one reflective surface;
- an information handling device;
- a processor;
- a memory device that stores instructions executable by the processor to:
- receive user input to generate a three dimensional projection of an object in physical space;
- generate, using the at least one projection source, a plurality of perspective views of the object, wherein each of the plurality of perspective views is associated with a different angle of the object; and
- provide, using the plurality of perspective views, the three dimensional projection of the object at a predetermined location in the physical space using the at least one reflective surface;
- wherein the at least one reflective surface comprises four triangular shaped reflective surfaces;
- wherein the four triangular shaped reflective surfaces are arranged in a pyramid shape over a printing base;
- wherein the instructions executable by the processor to provide comprise instructions executable by the processor to provide the three dimensional projection inside of the arranged four triangular shaped reflective surfaces.

9. The system of claim 8, wherein the three dimensional projection of the object comprises a 1:1 ratio projection of the object.

10. The system of claim 8, wherein the instructions executable by the processor to generate comprise instructions executable by the processor to generate the plurality of perspective views of the object at multiple predetermined positions.

11. The system of claim 8, wherein the predetermined location comprises a printing location of the object.

12. The system of claim 11, wherein the instructions are further executable by the processor to print the object at the printing location, wherein the printed object fills the three dimensional projection.

13. The system of claim 8, wherein the instructions are further executable by the processor to adjust the three dimensional projection during a printing duration of the object.

14. A product, comprising:
- a storage device that stores code, the code being executable by a processor and comprising:
- code that receives user input to generate a three dimensional projection of an object in physical space;
- code that generates a plurality of perspective views of the object, wherein each of the plurality of perspective views is associated with a different angle of the object; and
- code that provides, using the plurality of perspective views, the three dimensional projection of the object at a predetermined location in the physical space using at least one reflective surface;
- wherein the at least one reflective surface comprises four triangular shaped reflective surfaces;
- wherein the four triangular shaped reflective surfaces are arranged in a pyramid shape over a printing base;
- wherein the code that provides comprises code that provides the three dimensional projection inside of the arranged four triangular shaped reflective surfaces.

* * * * *